United States Patent

[11] 3,571,733

[72] Inventor Yang Fang
Clarksburg, Md.

[21] Appl. No. 759,644
[22] Filed Sept. 13, 1968
[45] Patented Mar. 23, 1971
[73] Assignee International Business Machines Corporation
Armonk, N.Y.

[54] ADAPTIVE DELAY LINE EQUALIZER FOR WAVEFORMS WITH CORRELATION BETWEEN SUBSEQUENT DATA BITS
5 Claims, 10 Drawing Figs.

[52] U.S. Cl. ........................................ 328/162,
325/42, 328/56, 328/160, 333/18
[51] Int. Cl. ........................................ H03b 1/00,
H04b 1/10, H03k 5/00
[50] Field of Search ........................................ 328/56,
156, 158, 160, 162, 163; 333/18, 28; 325/38, 42

[56] References Cited

UNITED STATES PATENTS

| | | | |
|---|---|---|---|
| 3,292,110 | 12/1966 | Becker et al. | 333/18 |
| 3,305,798 | 2/1967 | Rappeport | 333/18 |
| 3,368,168 | 2/1968 | Lucky | 333/18 |
| 3,375,473 | 3/1968 | Lucky | 333/18 |
| 3,403,340 | 9/1968 | Becker et al. | 333/18X |
| 3,414,819 | 12/1968 | Lucky | 333/18X |
| 3,414,845 | 12/1968 | Lucky | 333/18 |
| 3,477,043 | 11/1969 | Farrow | 333/18 |
| 3,479,458 | 11/1969 | Lord et al. | 333/18X |

*Primary Examiner*—Stanley D. Miller, Jr.
*Attorney*—Hanifin and Jancin

ABSTRACT: An adaptive delay line equalizer for correcting distortions superimposed upon a digital pulse train wherein there is a correlation between various bits of information. The equalizer automatically adapts itself to changing channel conditions by examining the composite output of the equalizer and feeding back this information simultaneously to at least two stages of the equalizer. This feedback is accomplished in accordance with the following formula:

INVENTOR
YANG FANG
BY James David Jacobs
AGENT

ADAPTIVE DELAY LINE EQUALIZER FOR WAVEFORMS WITH CORRELATION BETWEEN SUBSEQUENT DATA BITS

GOVERNMENT CONTRACT

The invention herein described was made in the course of or under a contract or subcontract thereunder, (or grant) with the Air Force, Contract No. F30–602–67–C–0168.

BACKGROUND OF THE INVENTION

1. Field of the Invention

The invention relates to devices utilizing miscellaneous electron space discharge systems or solid state device systems and in particular a system with distortion correction means with plural channels.

2. Prior Art

The prior art contains many devices for correcting the distortion in transmission channels mainly due to intersymbol interference. Generally, this has been accomplished by flattening the amplitude characteristic and linearizing the phase characteristics of the channel using fixed amplitude-frequency and phase-frequency networks. Although this type of equalization is adequate for speech transmission requirements, it does not provide the control over the channel's time response which is necessary for high-speed data transmission.

To realize the full transmission capability of the channel, automatic equalization devices have been designed. R. W. Lucky, in the Bell System Technical Journal, Apr. 1965, in an article entitled "Automatic Equalization for Digital Communication" describes a particular system which utilizes a precall automatic equalizer, i.e. test signals are placed upon the line before the call and an equalization network is adjusted at the receivers so as to correct any distortions detected on the received pulses. However, as Lucky himself realizes two limitations of this automatic equalization system are immediately apparent. The equalization network does not change the distortion correction as the channel's distortion pattern changes and, to adjust the equalization network entails sending test pulses. Further disadvantages found by Lucky were the long training period required to establish accurate final settings and the possibility of a nonlinear channel causing the transmission characteristics for future data transmission to be slightly different from those for isolated pulse transmission.

In order to overcome the above disadvantages, in another article published in the same journal, Feb. 1966, page 255, entitled "Techniques for Adaptive Equalization of Digital Communications Systems," Lucky describes an equalization network which automatically adapts itself to a channel with a varying distortion characteristic. In order to design a practical system certain assumptions must be made, and those made in the prior art (as illustrated by the latter Lucky article) are:

1. The noise samples $n_k$ are independent, identically distributed Gaussian variables with variance $\sigma^2$.
2. The input data symbols are uncorrelated.
3. The probabilities of error are relatively small, so that for practical purposes the sequence $[a_n]$ of input data samples is available at the output of the detector.
4. The channel response samples $h_n$ are essentially constant over the observation interval of $kt$ seconds.

Of the above assumptions, assumption 2 is particularly important in deriving the maximum likelihood designation of response values. This estimation is a key approximation in the simplification and derivation of Lucky's equalizer.

However, many communication systems utilize a digital format where subsequent data is correlated to prior data. For example, reference is made to FIG. 3 where a digital format in which input data symbols are correlated is illustrated. The two single elements used in constructing the data transmission are illustrated in FIG. 3*a*. The leftmost element shows a waveform which rises to the level A, continues at this level for a period *T*, returns to the level zero for a period *T*, and finally concludes at a level −A for a period *T*. The rightmost element shown in FIG. 3*a* illustrates the other basic waveform which has a −A level for period *T*, a zero level for period *T*, and then a positive +A level for a period *T*. Thus, the basic waveforms are either a rectangular pulse of period *T* of height A or −A, followed by a zero level for period *T*, followed by another rectangular pulse of period *T* and amplitude −A or +A, respectively. It will be herein assumed that the leftmost element in FIG. 3*a* represents a one, whereas the rightmost element represents a zero.

Illustrated in FIG. 3*b* is the utilization of the signal illustrated in FIG. 3*a* in a data stream. The symbols are illustrated below the line of one's and zero's which they code. That is, the first logical 1 is illustrated by a single element, similar to the leftmost 1 in FIG. 3*a*, denoted by the reference letter *a*. The second logical 1 is illustrated by a signal element denoted by the reference letter *b*. The third data symbol, a 0, is illustrated by a single element denoted by the reference letter *c*. Looking at the composite signal immediately below the first zero, it is seen that the negative portion of the first 1 adds algebraically to the negative portion of the first 0 resulting in a composite signal of amplitude −2A. Except for the meaningless dashed sections in the composite signal (meaningless because data before the composite signal and after the composite signal has not been superimposed upon the data that has been illustrated) the composite signal waveform is constricted to assume three levels of amplitude, 0, +2A, −2A. Thus, by utilizing signal elements as shown in FIG. 3*a* and combining them in the method shown in FIG. 3*b*, results in a composite waveform of three levels.

In FIG. 3*c* is illustrated another set of data elements. These elements consist of two pairs, each similar to the pair of FIG. 3*a*, but differing from each other in amplitude. Binary values can be assigned to each element as illustrated in the FIG. When these elements are combined as were the elements in FIG. 3*a*, a composite signal is obtained which has seven levels.

These signal elements have two important properties:

1. They have no DC component, and
2. Their frequency spectra have a null point at $1/2T$ Hz. where *T* is the period for each square pulse. The first property enables the use of SSB modulation in data transmission and the second property reduces the bandwidth needed for actual transmission almost to Nyquist's theoretical minimal requirement.

For further illustration of utilization of such signal waveforms as illustrated in FIG. 3 reference is made to U.S. Pat. No. 3,371,317, filed Jul. 23, 1965 by Dale L. Critchlow; No. 3,395,391, filed Aug. 23, 1965 by Etienne P. Gorog et al.; No. 3,419,804, filed May 12, 1965 by Etienne P. Gorog et al.; and No. 3,419,805, filed Oct. 8, 1965, by Michael Melas.

The importance of the above discussion is to illustrate that data waveforms where subsequent bit positions may correlate to previous bit positions are utilized to great advantage in the prior art. Thus, the prior art adaptive equalizers which depend upon the validity of assumption 2 would not function adequately with signal elements of the form illustrated in FIG. 3.

SUMMARY OF THE INVENTION

It is therefore an object of the present invention to construct a time domain equalizer for data streams where subsequent data bits have correlation.

Further, it is an object of this invention to design a time domain equalizer which automatically adapts to changing conditions in the transmission channel and demodulator.

The invention is an adaptive time domain equalizer for waveforms consisting of individual data elements of the form illustrated in FIG. 3. As shown below the same equalizer performs equally well for data of the configuration of FIG. 3*a* or FIG. 3*c*. Data is accepted and passed along an analogue delay line. At equidistant distances along the delay line data is tapped out of the delay line, attenuated and summed. This signal representing the sum is the corrected data which has been compensated for the intersymbol interference superimposed upon the transmitted data by the channel and demodulator.

The attenuation of the tapped outputs of the delay line is determined by an averaging process over a sufficiently long interval such that the data samples contained therein can be considered random on a probabilistic basis. Three quantities, which are added or subtracted from each other and totaled over the period for which the average is taken, determine whether the attenuation for each tap is to be increased or decreased. The three quantities summed are the sign of the data for that tap at some previous time multiplied times the error (the actual data transmitted minus the data at that tap as produced at the output of the summing amplifier) for that tap at some previous time, one-half of the sign of the error for the data of that tap multiplied times the sign of the data of the second previous tap for that time, and one-half of the sign of the data for that tap multiplied times the sign of the error of the data of the second previous tap at that time, i.e.

$$\bar{h}_j=\frac{1}{6KA^2}\sum_{k=1}^{K}\left[(\text{sgn } e_k)(\text{sgn } a_{k-j})+\frac{1}{2}(\text{sgn } e_k)(\text{sgn } a_{k+2-j})+\frac{1}{2}(\text{sgn } e_{k+2})(\text{sgn } a_{k-j})\right]$$

$$\bar{h}_j=\frac{1}{6KA^2}\sum_{k=1}^{K}\left[(\text{sgn } e_k)(\text{sgn } a_{k-j})+\frac{1}{2}(\text{sgn } e_k)(\text{sgn } a_{k+2-j})+\frac{1}{2}(\text{sgn } e_{k+2})(\text{sgn } a_{k-j})\right]$$

(sgn will be used as an abbreviation denoting the sign of the quantity that follows.)

In the preferred embodiment the sign multiplications are performed by a mod-2 addition (exclusive OR's) and the averaging is performed by a storage counter of a given capacity whose overflow or underflow indicates that the given averages have been exceeded. Whenever an underflow or overflow occurs the storage counter is set back at its mean position. Various shift registers store the various previous data bits and error bits such that they are made available to the appropriate multipliers at the appropriate times.

The foregoing and other objects, features and advantages of the invention will be apparent from the following more particular description of the preferred embodiment of the invention, as illustrated in the accompanying drawings.

GENERAL DESCRIPTION

Figure 1:
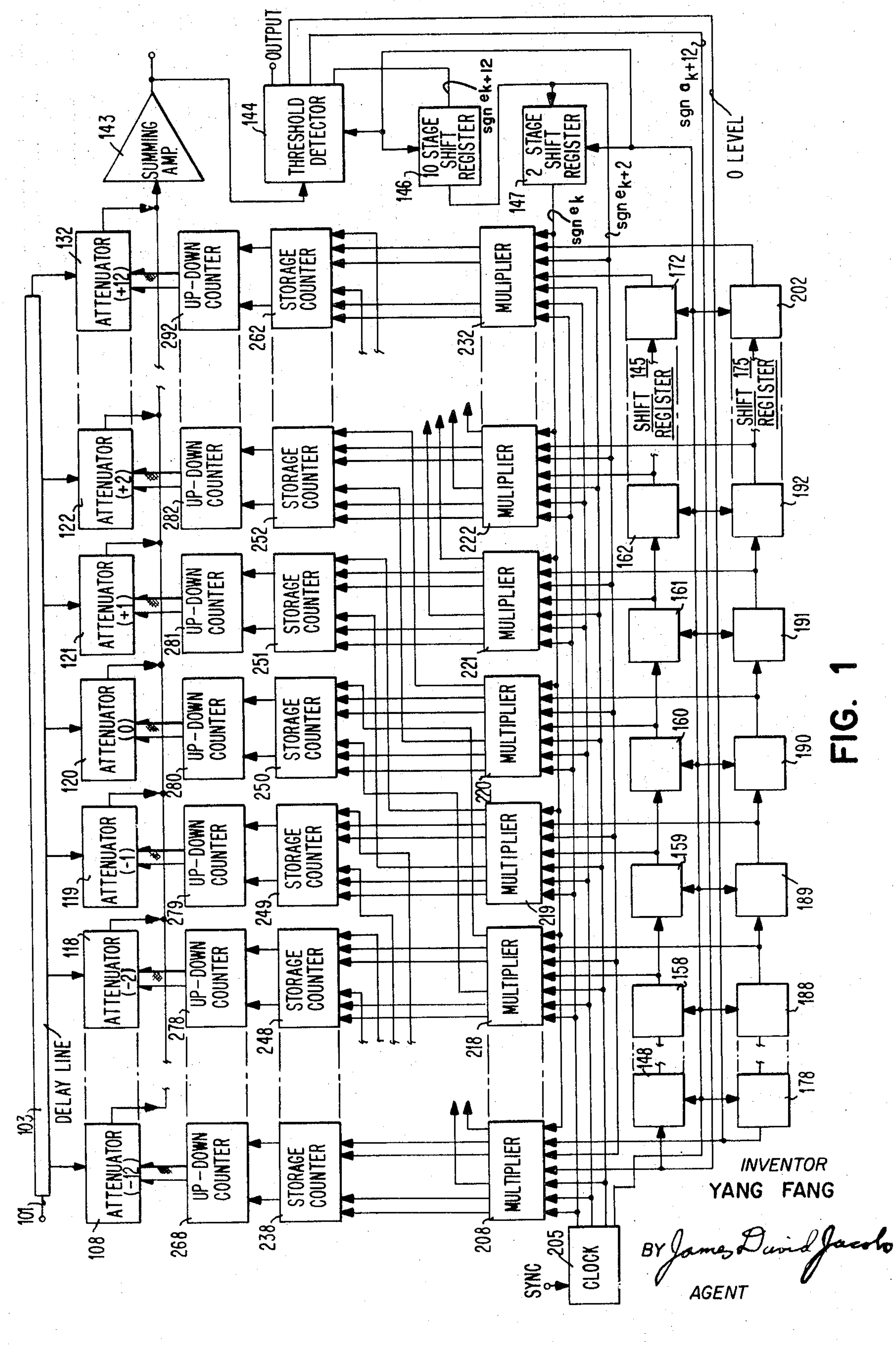
FIG. 1 is a block diagram of the preferred embodiment of the time domain equalizer.

As mentioned above Lucky has described in the cited papers an adaptive time domain equalizer for use with input data symbols which are uncorrelated. [The term "adaptive" will be used herein when applied to an apparatus to mean that that apparatus automatically adapts itself to changing conditions on its input network.] However, the present invention is designed to equalize a data channel wherein the input data is correlated as opposed to being uncorrelated as in the prior art.

Let us consider a sufficiently long sequence of transmitting data symbols consisting of the set $a_k$ ($[a_k]$). "Sufficiently long" means that over this interval the data symbols can be considered to be essentially random and that statistical estimations are valid. During a time interval of $kt$ seconds, where a data symbol $a_k$ is transmitted every $T$ seconds (i.e. $[a_k]$ of $K$ symbols), after passing through the transmission system and time domain equalizer the output voltage at $t=kt$ (disregarding the delay of the transmission system and time domain equalizer) is:

$$y_k=\sum_{n=-\infty}^{\infty} a_n h_{k-n}+n_k \quad (1)$$

where $a_n$'s are members of a data symbol sequence $[a_k]$, the $\eta_k$'s are noise samples, and the $h_n$'s are the samples of the overall system impulse function including the time domain equalizer. Further utilizing assumptions 1, 3, and 4 discussed under Background of the Invention, the $a_n$'s can be considered to be correct at the output since assumption 4 states that the probability of error is relatively small. Therefore, the samples $y_k$ can be regarded as being determined by the noise $\eta_k$ and the parameters $h_n$. By assumption 2, the probability density of $y_k$ is:

$$p(y_k)=\frac{1}{\sigma\sqrt{2\pi}}\exp\left[-\frac{1}{2\sigma^2}\left(y_k-\sum_{n=-\infty}^{\infty} a_n K_{k-n}\right)^2\right] \quad (2)$$

where $\sigma^2$ is the noise variance.

Since identical noise samples are assumed the joint probability density function of $y_k$ in $y_{k+2}$ is:

$$p(y_k, y_{k+2})=\frac{1}{2\pi\sigma^2(1-p^2)^{1/2}}X \exp\left\{-\frac{1}{2\sigma(1-P^2)}\left[\left(y_k-\sum_{n=-\infty}^{\infty} a_n h_{k-n}\right)^2+\left(y_{k+2}-\sum_{n=-\infty}^{\infty} a_n h_{k+2}\right)^2-2p\left(y_k-\sum_{n=-\infty}^{\infty} a_n h_{k-n}\right)\left(y_{k+2}-\sum_{n=-\infty}^{\infty} a_n h_{k+2-n}\right)\right]\right\} \quad (3)$$

where $\rho$ is the correlation coefficient between $y_k$ and $y_{k+2}$.

Figure 4A:
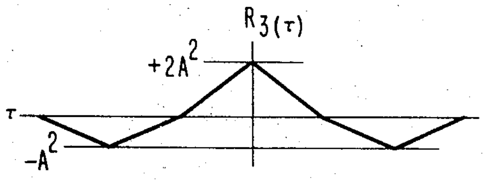
FIGS. 4*a* and 4*b* are a graphical description of the correlation functions of the data symbols illustrated in FIGS. 3*a* and 3*c*, respectively.
Figure 3A:
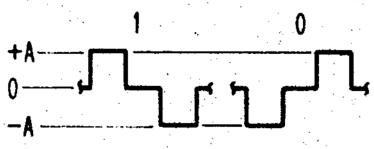
FIGS. 3*a*, 3*b* and 3*c* are a graphical display of the data symbols and data streams used in conjunction with the invention.
Figure 3C:
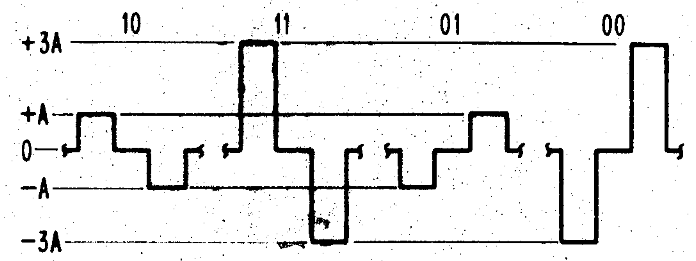
Figure 3B:
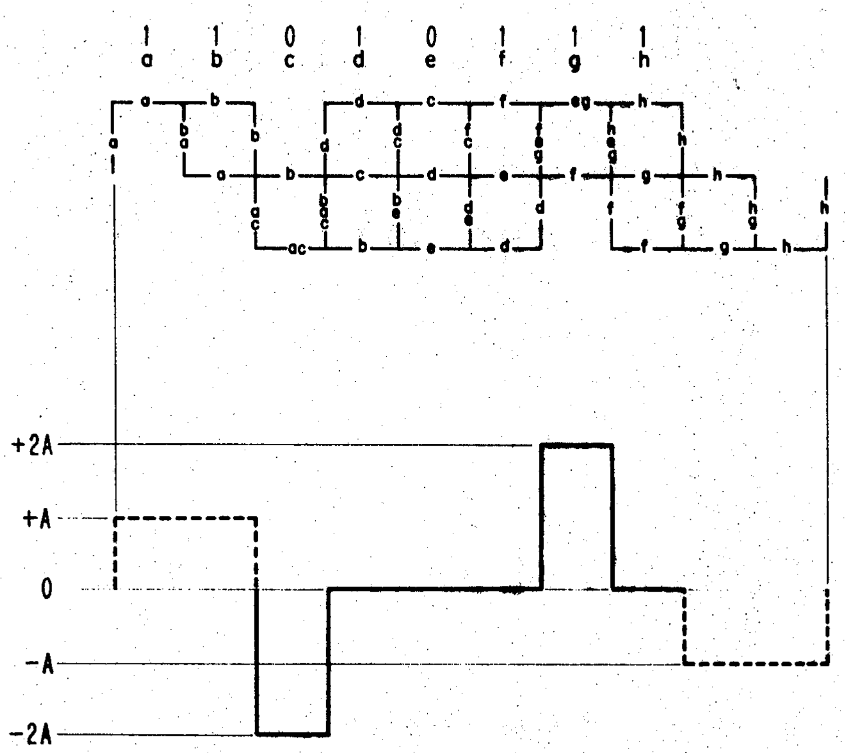

In determining the correlation coefficient $\rho$ between $y_k$ and $y_{k+2}$ the autocorrelation functions for the various waveforms must be plotted. In either of the basic sets of signal elements (FIGS. 3*a* or 3*c*) only the $k^{th}$ and the $k+2^{th}$ data symbols are correlated, i.e. all other data symbols other than $k+2^{th}$ are independent of the $k^{th}$ data symbol. By listing the various possible relationships between the $k^{th}$ data symbol and the $k+2^{th}$ data symbol and the probability of their occurrence autocorrelation functions can be derived for both sets of basic symbols. These autocorrelation functions can be derived for both sets of basic symbols. These autocorrelation functions are plotted in FIG. 4, the function plotted in FIG. 4*a* representing the data symbols contained in FIG. 3*a*, and the autocorrelation function plotted in 4*b* representing the data symbols contained in FIG. 3*c*.

From FIG. 4 it is seen that the autocorrelation functions have the same shape. From these FIGS. the correlation coefficient between the $k^{th}$ and $k+2^{th}$ data symbol is:

$$\rho_{k,\, k+2}=\frac{-5A^2}{10A^2}=-\frac{1}{2} \quad (4)$$

The joint probability density function of the sample sequence $[y_k]$, $k=1, 2, \ldots K$ is $$p(\{y_k\}) = \frac{p(y_1, y_3)p(y_2, y_4)p(y_3, y_5)p(y_4, y_6) \cdots p(y_{K-2}, y_K)}{p(y_3)p(y_4) \cdots p(y_{K-2})}$$

$$= \left[\frac{1}{(2\pi\sigma)^K (3/2)^{K-2}}\right] X$$

$$\left[\frac{\left[\prod_{k=1}^{K-2} \exp\left[-\frac{(y_k - \Sigma a_n h_{k-n})^2 + (y_{k+2} - \Sigma a_n h_{k+2-n})^2}{2\sigma^2(3/4)} + \frac{(y_k - \Sigma a_n h_{k-n})(y_{k+2} - \Sigma a_n h_{k+2-n})}{2\sigma^2(3/4)}\right]\right]}{\prod_{k=3}^{K-2} \exp\left[-\frac{(y_k - \Sigma a_n h_{k-n})^2}{2\sigma^2}\right]}\right] \quad (5)$$

the small sigma used in equation (5) represents summation as $N$ goes from $-\infty$ to $+\infty$. The likelihood function is the logarithm of $p$ ([$y_k$). Except for a constant, this is $$L(\{y_k\}) = \frac{-4}{6\sigma 2}\left\{\frac{5}{4}\sum_{k=1}^{K} (y_k - \Sigma a_n h_{k-n})^2 + \sum_{k=1}^{K-2} (y_k - \Sigma a_n h_{k-n})(y_{k+z} - \Sigma a_n h_{k+2-n})\right\} \quad (6)$$

In a $(2N+1)$ stage time domain equalizer only the $(2N+1)$ responses $h_j$, $j=-N$, ..., $+N$, can be assumed to have nonzero values. Thus $$y_k - \sum_{n-\infty}^{\infty} a_n h_{k-n} = y_k \infty \sum_{j-N}^{N} a_{k-j} h_j$$

$$= y_k - a_k - a_k(h_o - 1) - \sum_{j=-N}^{N} a_{k-j} \bar{h}_j \quad (7)$$

$$\bar{h}_j = \begin{cases} h_j \text{ for } j \neq 0 \\ h_o - 1 \text{ for } j = 0 \end{cases} \quad (8)$$

and noticing that $(y_k - a_k)$ is actually a measurement of the error $e_k$ between $y_k$ and the desired data symbol $a_k$, $$y_k - \sum_{n=-\infty}^{\infty} a_n h_{k-n} = e_k - \sum_{j=-N}^{N} a_{k-j} \bar{h}_j \quad (9)$$

The likelihood function becomes $$L(\{y_k\}) = -\frac{4}{6\sigma^2}\left\{\frac{5}{4}\sum_{k=1}^{K}\left(e_k - \sum_{j=-N}^{N} a_{k-j} h_j\right)^2 + \sum_{k=1}^{K-2}\left(e_k - \sum_{j=-N}^{N} a_{k-j}\bar{h}_j\right)\left(e_{k+2} - \sum_{j=-N}^{N} a_{k+2-j}\bar{h}_j\right)\right\} \quad (10)$$

The maximum likelihood estimates of the $(2N+1)$ response values $h_j$ are determined by the $(2N+1)$ simultaneous equations $$\frac{\partial L}{\partial \bar{h}_J} = 0.$$

Thus $$\frac{5}{2}\sum_{k=1}^{k}\left(e_k - \sum_{j=-N}^{N} a_{k-j}\bar{h}_j\right) a_{k-j} + \sum_{k=1}^{k-2}\left[\left(e_k - \sum_{j=-N}^{N} a_{k-j}\bar{h}_j\right) a_{k+2-j} + \left(e_{k+2} - \sum_{j=-N}^{N} a_{k+2-j}\bar{h}_j\right) a_{k-j}\right] = 0 \quad (11)$$

Figure 4B:
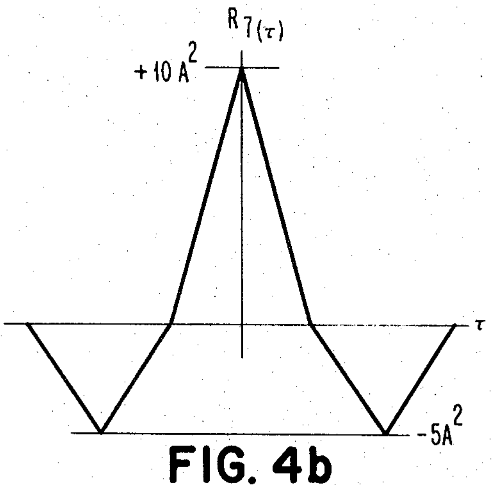

From the autocorrelation function for the 7-level signal in FIG. 4*b* (using the 3-level signal function in FIG. 4*a* would not change the end result since only the ratio is important)

$$\frac{1}{K}\sum_{k=1}^{K} a_{k-j} a_{k-j} = R_7(\sigma) = 10A^2 \quad (12)$$

$$\frac{1}{K}\sum_{k=1}^{K} a_{k-j} a_{k-j+2} = \frac{1}{K}\sum_{k=1}^{K} a_{k-j} a_{k-j-2} = R_7(2T) = -5A^2 \quad (13)$$

and $$\sum_{k=1}^{K} a_k a_{k+n} = 0 \quad n \neq 0, \pm 2 \quad (14)$$

With the help of Equations (12), (13) and (14), Equation (11) reduces to $h_j$–1/6 ($h_{j12}h_{j+}$2)–1/3 ($h_{j14}$+$h_{j+4}$)

$$= \frac{1}{6KA^2}\sum_{k=1}^{K}\left(e_k a_{k-j} + \frac{2}{5} e_k a_{k+2-j} + \frac{2}{5} e_{k+2} a_{k-j}\right) \quad (15)$$

$j=-N, \ldots, +N$.

The exact solution of the $(2N+1)$ simultaneous equations (15) is extremely complex. Even if the exact solution was obtained, its implementation would be commercially prohibitive. Since the coefficients of the 2nd and 3rd terms on the left-hand side of Equation (15) are much smaller than the coefficients of $h_j$, it can be approximated that they can be ignored and Equation (15) becomes $$\bar{h}_j = \frac{1}{6KA^2}\sum_{k-1}^{K}\left(e_k a_{k-j} + \frac{2}{5} e_k a_{k+2-j} + \frac{2}{5} e_{k+2} a_{k-j}\right) \quad (16)$$

Equation (16) given an analogue relationship whose implementation would involve a considerable amount of expensive hardware. The preferred embodiment consists of digital circuits which implement Eq. (16) by utilizing the polarity information about $e_k$ and $a_k$. Thus Eq. (16) is reduced to $$\bar{h}_j = \frac{1}{6KA^2}\sum_{k=1}^{K}\left[(\text{sgn } e_k)(\text{sgn } a_{k-j}) + \frac{1}{2}(\text{sgn } e_k)(\text{sgn } a_{k+2-j}) + \frac{1}{2}(\text{sgn } e_{k+2})(\text{sgn } a_{k-j})\right] \quad (17)$$

The time domain adaptive equalizer in FIG. 1 illustrates the preferred embodiment of Eq. (17).

DESCRIPTION OF FIGURE 1

Figure 2:
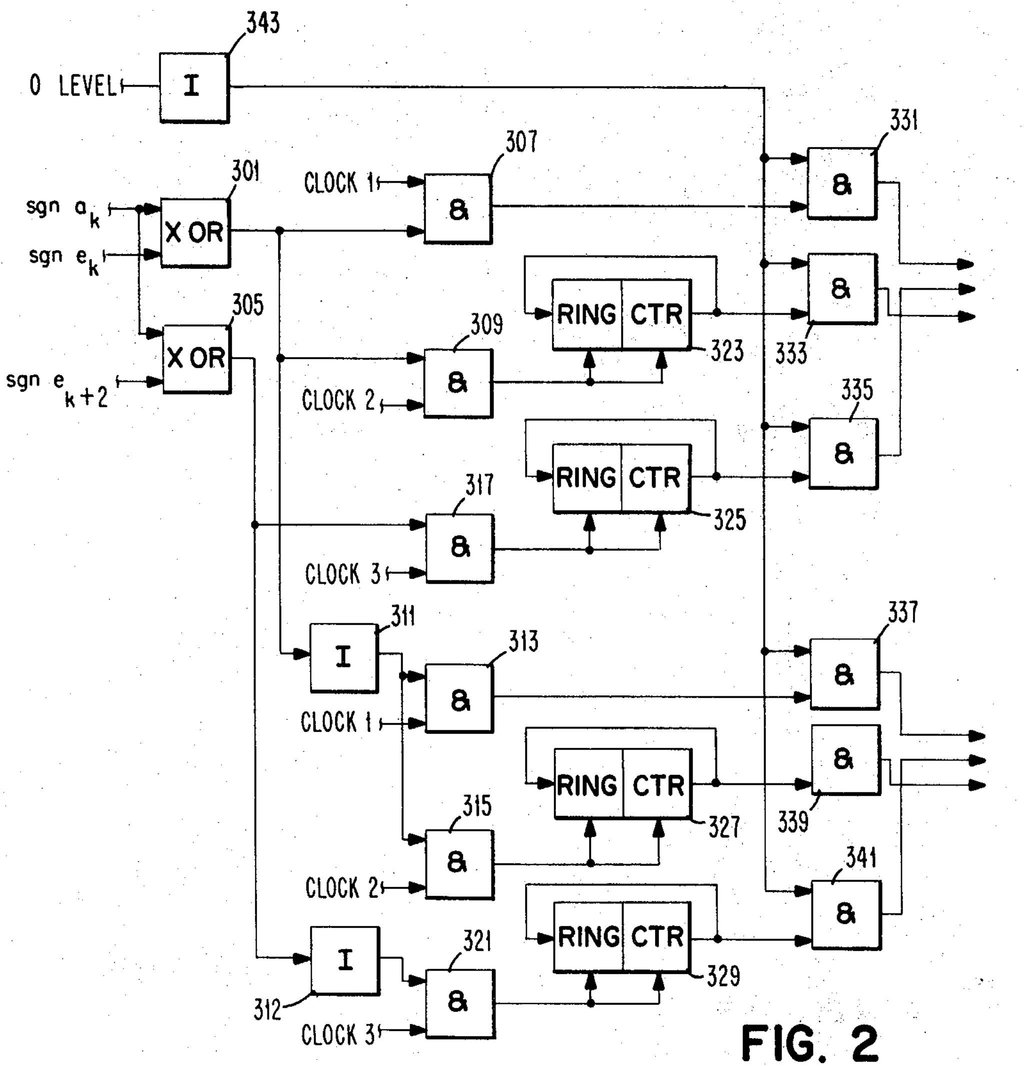
FIG. 2 is the preferred embodiment of the multipliers illustrated in FIG. 1.

Referring now to FIG. 1 the preferred embodiment for the adaptive equalizer is illustrated. Although in the preferred embodiment $N$=12, i.e.$-N<j<N$ it is recognized that $N$ can assume any other convenient value. After initial processing (receiving, mixing down to intermediate frequency, etc.) the received analogue waveform is accepted at input 101 of analogue delay line 103. For supplying the data to the equalizing network equidistant along analogue delay line 103 are taps whose output are amplified by attenuators 108 through 142. The output of each of the attenuators is summed by scaling amplifier 143. The output of scaling amplifier 143 presents the output $y_k$ and also the input for threshold detector 144. Threshold detector 144 determines the sgn $a_{k+12}$ and sgn $e_{k+12}$. If the signal has the value zero this is indicated on the third output. Sgn $a_{k+12}$ output is fed into shift register 145 which is composed of stages 148 through 172. The zero level output of threshold detector 144 is fed into shift register 175 composed of stages 178 through 202. Also, both the zero level output and the sgn $a_{k+12}$ output of threshold detector 144 are fed directly into multiplier 208. (The preferred embodiments of multipliers 208 through 232 are illustrated in FIG. 2.) The sgn $e_{k+12}$ output of threshold detector 144 is fed into the 10 stage shift register 146. The output of shift register 146 is fed both into two stage shift register 147 and multipliers 208 through 232.

It is to be noticed that the outputs of the respective stages of both shift register 145 and 175 form inputs to their respective multipliers, i.e. stage 160 of shift register 145 and stage 190 of shift register 175 form the input to multiplier 220. Also forming inputs to multipliers 208 through 232 is outputs of clock circuit 205. Clock circuit 205 presents three timing pulses to each of the multipliers 208 through 232, for each position of the data in shift registers 145 and 175 (i.e. three timing pulses during each period $T$), one timing pulse for each of the multiplication operations indicated in Equation (17).

Clock circuit 205 also supplies a timing signal to shift registers 175, 145, 147, 146, and threshold detector 144 causing all but the latter to shift their data one stage and causing the latter to perform a sample and threshold operation. Clock circuit 205 can be synchronized through any of the presently well-known techniques through input 206. The outputs of multipliers 208 through 232 are fed into storage counters 238 through 262. The three leftmost inputs to each of the storage counters 238 through 262 cause the storage counter to count up whereas the three rightmost inputs cause the storage counters 238 through 262 to count down. The various connections between multipliers 208 through 232 with storage counters 238 through 262 are in accordance with Equation (17) as will be more fully explained below in conjunction with FIG. 2. For example storage counter 250 is connected to four outputs of its respective multiplier 220 and to two outputs of its twice proceeding multiplier 218. The capacity of the storage counters is determined by the period over which the pulse train is to be averaged. This is a matter of the specific data transmission rate, noise, etc. In the preferred embodiment each of the storage counters 238 through 262 can count to a maximum of 511 and are initially set at 256. For example, when one of the storage counters 238 through 262 contains 511 and is caused to count one more it causes an overflow and the storage counter is immediately reset back to 256 (C). Each storage counter 238 through 252 presents two outputs to their respective up down counter 268 through 292. Whenever an overflow occurs in a storage counter its respective up down counter is caused to count up one bit, whereas whenever an underflow occurs in a storage counter its up down counter is caused to count down one bit. Thus, the respective storage counters 238 through 262 cause the time domain equalizer to perform an averaging process of the samples produced by threshold detector 144. When the up down counter counts one more, the attenuator setting advances one step and when it counts one less, the attenuator setting retards one step. Thus, the attenuator coefficients $c_j$ are changed according to Equation (17). In the preferred embodiment up down counters 268 through 292 contain 256 bits. The count recorded in up down counter 268 through 292 controls the attenuation of their respective attenuators 108 through 142.

The output of the respective stages of shift register 175 (the zero level signal) is used as an inhibit signal in multipliers 208 through 222 as will be explained below in conjunction with FIG. 2.

DESCRIPTION OF FIGURE 2

Referring now to FIG. 2 the preferred embodiment of a multiplier representative of one multiplier of the multipliers 208 through 232. Although the preferred embodiment uses logic circuits of AND, OR's, etc. it is well recognized other logic systems such as NAND's, NOR's, etc., can be utilized. For purposes of explanation the multiplier in FIG. 2 will be considered to represent multiplier 220 of FIG. 1. Shown as inputs to the multiplier are the seven inputs to multiplier 220, from the zero level shift register stage 190, from the sgn $a_k$ shift register 145 stage 160, from the sgn $e_k$ shift register 147, from the sgn $e_{k+2}$ shift register 146, and the three clock lines from clock circuit 205. Sgn $a_k$ forms an input to both Exclusive OR's 301 and 305. The other input to Exclusive OR 301 is sgn $e_k$ and the other input to Exclusive OR 305 is sgn $e_{k+2}$. The output of Exclusive OR 301 forms an input to AND circuits 307, 309, and inverter 311. The output of inverter 311 in turn forms the inputs to AND circuits 313 and 315. The output of Exclusive OR 305 forms the AND input to AND circuit 317 and inverter 319 the output of which in turn forms an input to AND circuit 321. The three inputs to multiplier 220 from clock circuit 205 form inputs to the AND circuits as follows: clock 1 forms the other input to AND circuits 307 and 313, clock 2 forms the other inputs to AND circuits 309 and 315, and clock 3 forms the other input to AND circuits 317 and 321. The outputs of AND circuits 309, 317, 315, and 321, provide the shift signals for two stage ring counters 323, 325, 327, and 329. These ring counters in effect divide the output of their respective AND circuits by one-half. That is, it takes two positive bits of output from one of AND circuits 309, 317, 315, or 321 to cause the single positive bit circulating in their respective two stage ring counters to shift to the output of that ring counter.

The output of AND circuit 307, ring counter 323, ring counter 325, AND circuit 313, ring counter 327, and ring counter 329, form the inputs to AND circuit 331, 333, 335, 337, 339, and 341, respectively. The input to the multiplier from the zero level shift register 175, and in particular according to the supposed example from stage 190, forms the input to inverter 343. The outputs of inverter 343 forms the other inputs to AND circuits 331, 333, 335, 337, 339, and 341. As those skilled in the art will realize when a positive bit appears in stage 190 of the shift register 175 (indicating a zero level for the sampled bit $a_k$) the output of the multiplier illustrated in FIG. 2 will be inhibited. For all other times (i.e. when the zero level shift register 175 has a zero bit indicated therein) the output of AND circuit 331 will be representative of sgn $a_k$ sgn $e_k$, of AND circuit 333 representative of ½sgn $a_k$ sgn $e_k$, of circuit 335 representative of ½sgn $a_k$ sgn $e_{k+2}$, of AND circuit 337 representative of $\overline{\text{sgn } a_k \text{ sgn } e_k}$, of AND circuit 339 representative of ½ $\overline{\text{sgn } a_k \text{ sgn } e_k}$, and AND circuit 341 representative of $\overline{\text{½sgn } a_k \text{ sgn } e_{k+2}}$.

As was explained above the reason for the zero level inhibiting the output of the multiplier illustrated in FIG. 2 is that the zero level usually contributes nothing to the estimate of $\bar{h}_j$. Furthermore, sgn $a_k$ for the zero level has no meaning and has to be excluded in the estimate of $\bar{h}_j$. Therefore, the zero level signal is used as an inhibit signal in the multiplier circuits.

The upper three outputs, i.e. outputs of AND circuits 331, 333, and 335 form the inputs to their respective storage counters (illustrated in FIG. 1) causing those storage counters to count upward a logical one. Similarly, the output of AND circuits 337, 339, and 341 form the inputs to their respective storage counters and cause those counters to count down one bit.

For example, assuming as above the multiplier illustrated in FIG. 2 is representative of multiplier 220 in FIG. 1, outputs of AND circuit 331 and 335 ($\overline{\text{sgn } a_k \text{ sgn } e_k}$ and $\overline{\text{½sgn } a_k \text{ sgn } e_{k+2}}$) represents the two leftmost lines emanating from multiplier 220 and terminating at storage counter 230; similarly, the outputs of AND circuits 337 and 341 (sgn $a_k$ sgn $e_k$ and ½sgn $a_k$ sgn $e_{k+2}$) represent the two leftmost lines in the right-hand group emanating from multiplier 220 and terminating in storage counter 230. The remaining outputs of multiplier 220 (½sgn $a_k$ sgn $e_k$ and ½ $\overline{\text{sgn } a_k \text{ sgn } ek}$) form the inputs to storage counter 252, where as the other inputs of storage counter 230 are formed by the outputs of multiplier 218. That is, these latter outputs of multiplier 218 (½sgn $e_k$ sgn $a_{k+2}$ and ½sgn $e_k$ sgn $a_{k+2}$) analogize to the outputs from AND circuits 333 and 339 which form inputs to multiplier 252. It is seen by referring that Equation (17) is satisfied for storage counter 230 since $j$=0 for that counter.

OPERATION

Figure 5A:
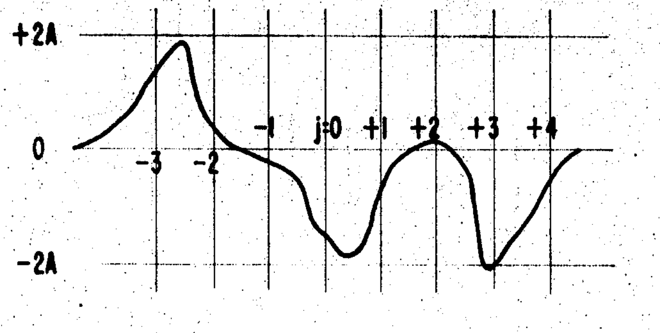
FIGS. 5*a*, 5*b* and 5*c* are graphical descriptions of the waveforms in various parts of the invention.
Figure 5B:
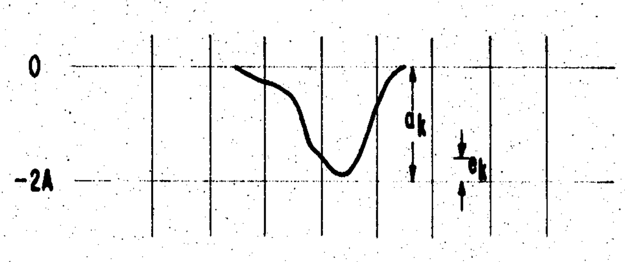

Referring to FIG. 5 a macroscopic description of the operation of the invention will now be given. Illustrated in FIG. 5*a* is a pulse train as it appears on delay line 103 centered about attenuator 130. The pulse at attenuator 130 ($j$=0) in the pulse train is isolated in FIG. 5*b*. Also in FIG. 5*b* the action of threshold detector 144 is illustrated. The threshold detector determines that the sgn $a_k$ is negative and the sign of $e_k$ is positive. That is, the value of $a_k$ is assumed to be minus $2a$ (since that is the closest acceptable value at $j=0$). The signal deviates from this value at $j=0$ by approximately +½A. Therefore, the sign of the error, $e_k$ is positive.

Sgn $a_k$ and sgn $e_k$ have been fed into the appropriate multipliers through the appropriate shift registers along with all sgn $a_k$'s and sgn $e_k$'s from $k+12$ to $k-12$. At this point each of the clock lines 1—3 are energized in sequence by clock circuit 205. Referring specifically to multiplier 220, it will produce a product and its inverse of this product simultaneously and in the order sgn $a_k$ sgn $e_k$, ½sgn $a_k$ sgn $e_k$, and ½sgn $a_k$ sgn $e_{k+2}$. Whether the products are positive or negative will cause the storage counter to which they are fed, in the case of the first two products storage counter 230 and in the case of the last product storage counter 251, to add or subtract one count, respectively.

Storage counter 230 is fed by four of the outputs of multiplier 220 and two of the outputs of multiplier 219. When the positive counts exceed the negative counts by 256 (the negative counts exceed the positive counts by 256) the storage counter will overflow (underflow). This will cause up down counter 280 to increase (decrease) one count and thereby causing attenuator 120 to further attenuate (amplify) its input. Thus, attenuator 120 has been adjusted according to Eq. (17). Similarly, all other attenuators 108—132 are adjusted.

Figure 5C:
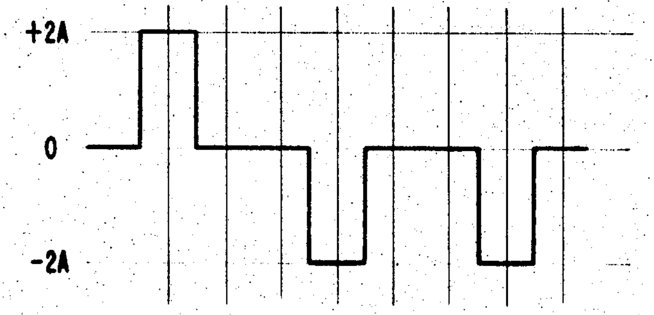

As time progresses the output from summing amplifier 143 (i.e., FIG. 5*a*) should approach the ideal waveform of FIG. 5*c*. The corrected waveform itself as produced by the top output of the threshold detector 144 is shown in FIG. 5*c*.

While the invention has been particularly shown and described with reference to a preferred embodiment thereof, it will be understood by those skilled in the art that various changes in form and detail may be made therein without departing from the spirit and scope of the invention.

I claim:

1. An adaptive delay line equalizer comprising:

supply means for supplying a plurality of sequential data bits;

amplification means connected to each of said supply means modifying the output of said supply means;

summing means connected to the output of said amplifying means producing a signal equal to the sum of said outputs;

detector means connected to the output of said summing means and producing at least two different outputs descriptive of said sum; and multiplication means multiplying the outputs from said detector means with one another and with previous outputs of said detector means and said products from at least two multipliers controlling the amplification of said amplification means, the output of said amplifications representing the equalized waveform.

2. An adaptive delay line equalizer as in claim 1 wherein the detector means produces three outputs: a first signal representing the sign of the signal output of said summing means, a second signal representing the sign of the error of said first signal, and a third signal indicating if the signal output from said summing amplifier represents a zero voltage.

3. An adaptive delay line equalizer comprising:

supply means for supplying $2N+1$ sequential data bits where $N$ is positive integer;

amplification means connected to each of said supply means modifying the output of said supply means;

summing means connected to the output of said amplifying means producing a signal equal to the sum of all of said outputs;

detector means connected to the output of said summing means and producing three outputs: a first signal representing the sign of the signal output of said summing means (sgn $a_k$), a second signal representing the sign of the error of said first signal (sgn $e_k$), and a third signal indicating if the signal output from said summing amplifier represents a zero voltage ($0_k$);

delay means connected to each of the outputs of said detector means;

$2N+1$ multiplication means connected to the outputs of said delay means where the $j^{th}$ multiplier produces the products (sgn $a_k$) (sgn $e_k$), ½(sgn $a_k$) (sgn $e_k$) and ½(sgn $a_k$) (sgn $e_{k+2}$), where $j$ is an integer between $-N$ and $N$; and control means connected to the output of a plurality of multiplier means and to said amplification means, said control means, in accordance with its input, controlling the amplification of said amplifier means, the output of said amplifier representing the equalized waveform.

4. An adaptive delay line equalizer comprising:

a delay line having $2N+1$ taps equally spaced therealong, where $N$ is a positive integer;

attenuators connected to each of the taps of said delay line;

a summing amplifier connected to the output of said attenuators producing a signal equal to the sum of all said outputs;

a threshold detector connected to the output of said summing amplifier and having a first output producing a first signal representing the sign of the signal output of said summing amplifier ($a_k$), a second output producing a second signal representing the sign of the error of said first signal ($e_k$), and a third output producing a third signal indicating if the signal from said summing amplifier represents a zero voltage ($0_k$);

a first shift register connected to said threshold detector having at its outputs $e_k$ *and* $e_{k+2}$;

a second shift register connected to said threshold detector producing at its outputs sgn $a_{k+n}$ to sgn $a_{k1n}$; and third shift register connected to said threshold detector producing at its outputs $0_{k+n}$ to $0_{k1n}$;

$2N+1$ multipliers, a first of said multipliers being connected to each output of said first shift register and to said first and third outputs of said threshold detector, each of the remaining of said multipliers being connected to each of output of said first shift register and to respective stages of said second and said third shift registers, such that the $j^{th}$ multiplier produces the products (sgn $a_{k1j}$) (sgn $e_k$), ½ (sgn $a_{k1j}$) (sgn $e_k$), and ½(sgn $a_{k1j}$) (sgn $e_{k+2}$);

$2N+1$ storage counters, a first of said storage counters being connected to said first of said multipliers, a second of said storage counters being connected to a second of said multipliers, each of the remaining of said storage counters being connected to a respective multiplier and to a twice proceeding multiplier, such that the $j^{th}$ storage counter sums the following outputs:

(sgn $e_k$) (sgn $a_{k1j}$) + ½(sgn $e_k$) (sgn $a_{k+21j}$) + ½(sgn $e_{k+2}$) (sgn $a_{k1j}$), said storage counter overflowing or underflowing when a certain count has been reached in either direction, thereby averaging its inputs; and control means connected to the output of said storage counter and to said attenuators, increasing or decreasing the attenuation of said attenuators depending upon whether said storage counter overflows or underflows, the output of said amplifier representing the equalized waveform.

5. An adaptive delay line equalizer as in claim 4 where $N=12$, and where said storage counters have a capacity of 256 counts in both directions.

UNITED STATES PATENT OFFICE
CERTIFICATE OF CORRECTION

Patent No. 3,571,733 Dated March 23, 1971

Inventor(s) Yang Fang

It is certified that error appears in the above-identified patent and that said Letters Patent are hereby corrected as shown below:

Formula after Abstract is missing. Should be inserted

-- $\bar{h}_j = \frac{1}{6KA^2} \sum_{k=1}^{K} [(\text{sgn } e_k)(\text{sgn } a_{k-j}) + \frac{1}{2}(\text{sgn } e_k)(\text{sgn } a_k$ $+\frac{1}{2}(\text{sgn } e_{k+2})(\text{sgn } a_{k-j})]$ --.

Column 3, line 72, the set "$a_k$ ([$a_k$)" should be written as --$a_k$ ([$a_k$])--.

Column 5, Equation 11, the upper limit of the first summatior expression of Eq. 11 is incorrectly shown as "k" whereas it s be read as --K--.

Column 5, Equation 11, the upper limit of the third summatior expression of Eq. 11 is incorrectly shown as "k" whereas it s be read as --K--.

Column 6, Equation 12, "$R_7(\sigma)=10A^2$" should be read as -- $R_7(0)=10A^2$--.

Column 6, line 14, the equation is incorrectly written, it sh read -- $\bar{h}_j - \frac{1}{6}(\bar{h}_{j-2} + \bar{h}_{j+2}) - \frac{1}{3}(\bar{h}_{j-4} + \bar{h}_{j+4})$ --.

UNITED STATES PATENT OFFICE
CERTIFICATE OF CORRECTION

Patent No. 3,571,733 Dated March 23, 1971

Inventor(s) Yang Fang PAGE - 2

It is certified that error appears in the above-identified patent and that said Letters Patent are hereby corrected as shown below:

Column 6, Equation 16, "$\bar{h}_j = \frac{1}{6\bar{K}A^2} \sum_{k-1}^{K}$" should be written as --$\bar{h}_j = \frac{1}{\bar{6}KA^2} \sum_{k=1}^{K}$ --.

Column 6, line 50, "$-N<j<N$" should read-- $-N \leq j \leq N$ --

Column 8, line 52, delete both occurrences of overscore, sho be read --(sgn $a_k$ sgn $e_k$ and 1/2 sgn $a_k$ sgn $e_{k+2}$--.

Column 8, line 55, add overscore to equation, should be read --($\overline{\text{sgn } a_k \text{ sgn } e_k}$ and 1/2 $\overline{\text{sgn } a_k \text{ sgn } e_{k+2}}$)--

Column 10, line 38, the term "sgn $a_{k1n}$" should be written as --sgn $a_{k-n}$--.

Column 10, line 40, the term "$0_{k1n}$" should be written as --$0_{k-n}$--.

Column 10, line 47, the equation "(sgn $a_{k1j}$)(sgn $e_k$), 1/2 (sgn $a_{k1j}$) (sgn $e_k$) and 1/2(sgn $a_{k1j}$) (sgn $e_{k+2}$)" should be written as --(sgn $a_{k-j}$) sgn $e_k$), 1/2 (sgn $a_{k-j}$)(sgn $e_k$) and 1/2 (sgn $a_{k-j}$) (sgn $e_{k+2}$)--.

UNITED STATES PATENT OFFICE
CERTIFICATE OF CORRECTION

Patent No. 3,571,733 Dated March 23, 1971

Inventor(s) Yang Fang PAGE - 3

It is certified that error appears in the above-identified patent and that said Letters Patent are hereby corrected as shown below:

Column 10, line 57, the equation "(sgn $e_k$)(sgn $a_{k1j}$)+1/2(sgn sgn $a_{k+21j}$)+1/2(sgn $e_{k+2}$) (sgn $a_{k1j}$)" should be written as --(sgn $e_k$) (sgn $a_{k-j}$)+1/2 (sgn $e_k$)(sgn $a_{k+2-j}$)+ 1/2(sgn $e_{k+2}$) (sgn $a_{k-j}$)--.

Signed and sealed this 2nd day of May 1972.

(SEAL)
Attest:

EDWARD M.FLETCHER,JR.
Attesting Officer

ROBERT GOTTSCHALK
Commissioner of Patents